US009298331B2

(12) United States Patent
Nakamura

(10) Patent No.: US 9,298,331 B2
(45) Date of Patent: Mar. 29, 2016

(54) CAPACITIVE TOUCH SENSOR, MANUFACTURING METHOD THEREFOR, AND DISPLAY DEVICE

(71) Applicant: NISSHA PRINTING CO., LTD., Kyoto (JP)

(72) Inventor: Kazuto Nakamura, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 0 days.

(21) Appl. No.: 14/439,017

(22) PCT Filed: Nov. 8, 2013

(86) PCT No.: PCT/JP2013/080325
§ 371 (c)(1),
(2) Date: Apr. 28, 2015

(87) PCT Pub. No.: WO2014/073666
PCT Pub. Date: May 15, 2014

(65) Prior Publication Data
US 2015/0277623 A1 Oct. 1, 2015

(30) Foreign Application Priority Data

Nov. 9, 2012 (JP) .................................. 2012-247253

(51) Int. Cl.
*G06F 3/045* (2006.01)
*G06F 3/044* (2006.01)
*B32B 37/02* (2006.01)

(52) U.S. Cl.
CPC .............. *G06F 3/044* (2013.01); *B32B 37/02* (2013.01); *B32B 2309/105* (2013.01); *B32B 2457/206* (2013.01); *B32B 2457/208* (2013.01); *G06F 2203/04103* (2013.01); *G06F 2203/04104* (2013.01); *Y10T 29/49105* (2015.01)

(58) Field of Classification Search
None
See application file for complete search history.

(56) References Cited

U.S. PATENT DOCUMENTS

| 2010/0182259 A1 | 7/2010 | Jung et al. |
| 2011/0151201 A1 | 6/2011 | Lee et al. |
| 2011/0256307 A1 | 10/2011 | Kim et al. |

FOREIGN PATENT DOCUMENTS

| JP | 2008-277022 | 11/2008 |
| JP | 2010-140370 | 6/2010 |
| JP | 2010-165332 | 7/2010 |
| JP | 2010-256981 | 11/2010 |
| JP | 2011-13725 | 1/2011 |
| JP | 2011-39759 | 2/2011 |

OTHER PUBLICATIONS

International Search Report issued Dec. 10, 2013 in International Application No. PCT/JP2013/080325.

*Primary Examiner* — Nicholas Lee
(74) *Attorney, Agent, or Firm* — Wenderoth, Lind & Ponack, L.L.P.

(57) ABSTRACT

Provided herein are a capacitive touch sensor capable of reducing pattern visibility, a manufacturing method therefor, and a display device with the touch sensor. In a capacitive touch sensor (1), a first layer (10) has first first-layer electrodes (3a); first-layer conductive portions (5) connecting the adjacent first first-layer electrodes (3a); second first-layer electrodes (4a); and first-layer insulating portions (7a) formed between the second first-layer electrodes (4a) and the first-layer conductive portions (5). An intermediate layer (12) has first intermediate-layer electrodes (3b) formed on the first first-layer electrodes (3a); second intermediate-layer electrodes (4b) formed on the second first-layer electrodes (4a); and intermediate-layer insulating portions (7b) formed between the first-layer conductive portions (5) and second-layer conductive portions (6). A second layer (15) has first second-layer electrodes (3c); second second-layer electrodes (4c); second-layer conductive portions (6) connecting the adjacent second second-layer electrodes (4c) in the Y-axis direction so as to intersect with the first-layer conductive portions (5); and second-layer insulating portions (7c) formed between the first second-layer electrodes (3c) and the second-layer conductive portions (6).

10 Claims, 7 Drawing Sheets

CAPACITIVE TOUCH SENSOR, MANUFACTURING METHOD THEREFOR, AND DISPLAY DEVICE

TECHNICAL FIELD

The present invention relates to a capacitive touch sensor applicable to input devices each having a liquid crystal panel or another image screen, such as mobile phones, PDAs, and small PCs; a manufacturing method therefor; and a display device with the capacitive touch sensor.

BACKGROUND ART

In recent years, liquid crystal display devices (LCDs), organic light emitting devices (OLEDs), or others, have been used for various purposes. Even many displays to be used outdoors make use of LCDs.

Further, LCDs have widely been used for dashboard panels, such as of vehicles, ships, or airplanes; car-mounted navigation systems; digital cameras; mobile devices such as mobile phones or personal computers; or digital signage to be used in, for example, buildings or supermarkets.

In such electronic equipment, there have widely been used touch sensors, each serving as a display and an input means.

Touch panels ordinarily used are of the optical type, ultrasonic type, electromagnetic induction type, resistive film type, or capacitive type. Touch panels of the resistive film type have often been combined with small liquid crystal displays. Touch panels of the resistive film type have a function as an input switch using transparent conductive films as conductors and having a structure that two transparent conductive films are opposed via a spacer. When they are pressed with a stylus or a finger, electrode surfaces mutually contact each other to cause electrical conduction, making possible the detection of its pressed position.

In contrast, touch panels of the capacitive type enable the detection of multiple points, what is called multi-touch, which cannot be achieved by those of the ordinary resistive film type, and therefore, capacitive touch panels have recently been attracting much attention.

Examples of the capacitive touch panel are disclosed in Patent Documents 1 and 2. These touch panels each comprises an X-electrode film having first island electrodes arranged in the X-axis direction and a first bridge wiring film electrically connecting the adjacent first island electrodes; and a Y-electrode film having second island electrodes arranged in the Y-axis direction perpendicular to the X-axis direction and a second bridge wiring film electrically connecting the adjacent second island electrodes. The first bridge wiring film and the second bridge wiring film are insulated from each other by an insulating film.

Another example of the capacitive touch panel is disclosed in Patent Document 3. In the capacitive touch panel of Patent Document 3, second electrodes arranged in the Y-axis direction are provided over conductive portions of first electrodes arranged in the X-axis direction. The second electrodes and the conductive portions are insulated from each other by an intermediate insulating layer.

PRIOR ART DOCUMENTS

Patent Documents

Patent document 1: JP-A 2011-013725
Patent document 2: JP-A 2011-039759
Patent document 3: JP-A 2010-140370

SUMMARY OF THE INVENTION

Problems to be Solved by the Invention

In the above touch panels of Patent Documents 1 and 2, the second island electrodes and the second bridge wiring films are covered with a flattening film. In the above touch panel of Patent Document 3, the second electrodes are covered with an adhesive layer and a protective sheet in this order. These touch panels, however, have a problem that a pattern, such as of electrodes or wires, becomes easily visible by the naked eyes due to a difference, such as in refractive index, transmittance, or hue. Such a phenomenon will hereinafter be referred to as pattern visibility.

The present invention is intended to provide a capacitive touch sensor capable of reducing pattern visibility, a manufacturing method therefor, and a display device with the capacitive touch sensor.

Means for Solving the Problems

A capacitive touch sensor according to the present invention comprises a layered structure of a first layer, an intermediate layer, and a second layer, each of which is formed on one main surface of a substrate and is made of a conductive polymer, wherein the first layer has multiple first-electrode lines, each of which is formed of multiple first first-layer electrodes arranged in a first direction and first-layer conductive portions each connecting the adjacent first first-layer electrodes; and multiple second-electrode lines, each of which is formed of multiple second first-layer electrodes arranged in a second direction different from the first direction;

the intermediate layer has first intermediate-layer electrodes respectively formed on the corresponding first first-layer electrodes; and second intermediate-layer electrodes respectively formed on the corresponding second first-layer electrodes;

the second layer has second second-layer electrodes respectively formed on the corresponding second intermediate-layer electrodes; second-layer conductive portions each connecting the adjacent second second-layer electrodes in the second direction so as to intersect with the first-layer conductive portions; and first second-layer electrodes respectively formed on the corresponding first intermediate-layer electrodes;

the first layer further has first-layer insulating portions formed between the first-electrode lines and the second first-layer electrodes;

the intermediate layer further has intermediate-layer insulating portions formed between the adjacent second intermediate-layer electrodes; and the second layer further has second-layer insulating portions formed between third-electrode lines and the first second-layer electrodes, the third-electrode lines being formed of the multiple second second-layer electrodes and the second-layer conductive portions.

In the present invention, the first-layer insulating portions may further be formed between the adjacent first-electrode lines and between the adjacent second first-layer electrodes; the intermediate-layer insulating portions may further be formed between the adjacent first intermediate-layer electrodes and between the first intermediate-layer electrodes and the second intermediate-layer electrodes; and the second-layer insulating portions may further be formed between the adjacent third-electrode lines and between the adjacent first second-layer electrodes.

In the present invention, the first-layer insulating portions, the second-layer insulating portions, and the intermediate-layer insulating portions may preferably be formed by inactivation of a conductive polymer.

In the present invention, the first layer and the intermediate layer may preferably be formed of a conductive polymer of the same type.

In the present invention, the intermediate layer and the second layer may preferably be formed of a conductive polymer of the same type.

In the present invention, poly(3,4-ethylenedioxythiophene) (PEDOT) or PEDOT/PSS may be used as the conductive polymer.

In the present invention, the first layer may be formed to have a thickness of 0.01 to 5.0 µm.

In the present invention, the intermediate layer may be formed to have a thickness of 0.01 to 5.0 µm.

A method for manufacturing a capacitive touch sensor according to the present invention comprises the steps of:

forming a first layer made of a conductive polymer on one main surface of a substrate;

patterning the first layer to form multiple first-electrode lines, each of which is formed of multiple first first-layer electrodes arranged in a first direction and first-layer conductive portions each connecting the adjacent first first-layer electrodes; multiple second-electrode lines, each of which is formed of multiple second first-layer electrodes arranged in a second direction different from the first direction; and first-layer insulating portions formed between the first-electrode lines and the second first-layer electrodes;

forming an intermediate layer made of a conductive polymer on the first layer;

patterning the intermediate layer to form first intermediate-layer electrodes respectively formed on the corresponding first first-layer electrodes; second intermediate-layer electrodes respectively formed on the corresponding second first-layer electrodes; and intermediate-layer insulating portions formed between the adjacent second intermediate-layer electrodes;

forming a second layer made of a conductive polymer on the intermediate layer; and patterning the second layer to form second second-layer electrodes respectively formed on the corresponding second intermediate-layer electrodes; second-layer conductive portions each connecting the adjacent second second-layer electrodes in the second direction so as to intersect with the first-layer conductive portions; first second-layer electrodes respectively formed on the corresponding first intermediate-layer electrodes; second-layer insulating portions formed between third-electrode lines and the first second-layer electrodes, the third-electrode lines being formed of the multiple second second-layer electrodes and the second-layer conductive portions.

A display device according to the present invention comprises a display panel and a touch sensor attached thereto, which touch sensor is a capacitive touch sensor as set forth above.

Effects of the Invention

The capacitive touch sensor according to the present invention has a structure that the first-layer conductive portions and the second-layer conductive portions intersect each other, in which the adjacent second intermediate-layer electrodes formed on the second first-layer electrodes, respectively, are insulated from each other by the intermediate-layer insulating portion. In addition, the first-layer insulating portions are formed between the first electrode lines (i.e., lines each having the first first-layer electrodes and the first-layer conductive portions) and the second first-layer electrodes, and the second-layer insulating portions are formed between the third electrode lines (i.e., lines each having the second second-layer electrodes formed on the second intermediate-layer electrodes, and the second-layer conductive portions) and the first second-layer electrodes. In such a structure, the first-layer insulating portions are located above or below the intermediate-layer insulating portions, and the second-layer insulating portions are located below or above the intermediate-layer insulating portions. Thus, the first-layer insulating portions and the second-layer insulating portions are insulated from each other by the intermediate-layer insulating portions. In addition, electrical connection between the adjacent second first-layer electrodes in the first layer can be achieved by forming the second intermediate-layer electrodes on the second first-layer electrodes, respectively, forming the second second-layer electrodes on the second intermediate-layer electrodes, respectively, and forming the second-layer conductive portion connecting the second second-layer electrodes.

As described above, in the structure that the first-layer conductive portions and the second-layer conductive portions are insulated from each other by the intermediate-layer insulating portions, the first electrodes (i.e., the first first-layer electrodes, the first intermediate-layer electrodes, and the first second-layer electrodes) and the second electrodes (i.e., the second first-layer electrodes, the second intermediate-layer electrodes, and the second second-layer electrodes) are provided in each of the first layer, the intermediate layer, and the second layer. Thus, steps between intersection portions (i.e., intersection regions of the first-layer conductive portions and the second-layer conductive portions) and the electrode portions are extremely reduced. Therefore, pattern visibility caused by step formation can be suppressed. In addition, the use of a conductive polymer as the material of each of the first layer, the intermediate layer, and the second layer, the optical properties (such as refractive index, transmittance, and hue) of the intersection portions and the electrode portions can be made uniform. Thus, pattern visibility can further be suppressed or prevented.

The manufacturing method of a capacitive touch sensor according to the present invention comprises respectively patterning the first layer, the intermediate layer, and the second layer, each of which is formed of a conductive polymer, thereby making it possible to form separately a portion (i.e., electrode) in which conductivity is to be maintained and a portion (i.e., insulating portion) in which conductivity is to be lowered. Therefore, capacitive touch sensors can easily be manufactured in a short time.

MODE FOR CARRYING OUT THE INVENTION

A capacitive touch sensor according to an embodiment of the present invention will be described below in detail with reference to FIGS. 1 to 9.

1. Structure of Capacitive Touch Sensor

Figure 1:
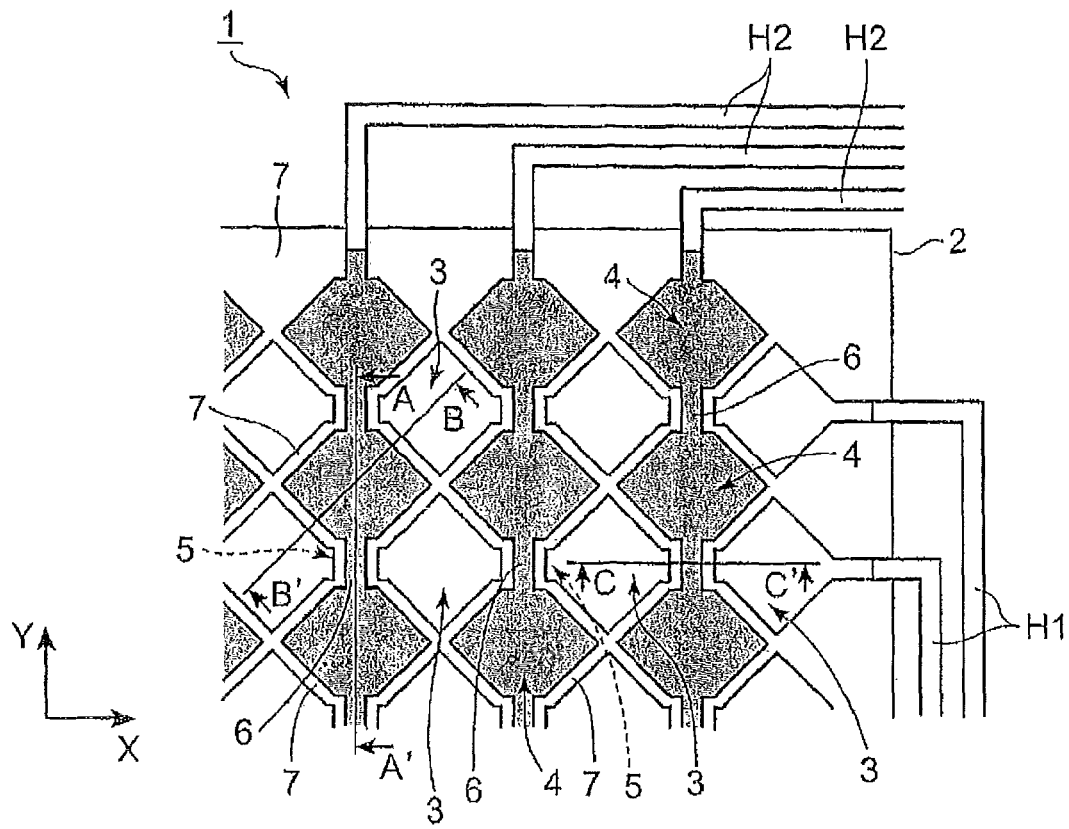
FIG. 1 is a plan view showing the structure of a capacitive touch sensor according to the present invention.

In FIG. 1, X-axis direction and Y-axis direction are defined as directions perpendicular to each other in a plane.

In the capacitive touch sensor 1 according to the present invention, first electrodes 3 are formed on one main surface of a substrate 2 so as to be arranged in the X-axis direction (i.e., the first direction), and the adjacent first electrodes 3, 3 are connected to each other via a first-layer conductive portion 5. In addition, second electrodes 4 are formed on the main surface so as to be arranged in the Y-axis direction (i.e., the second direction), and the adjacent second electrodes 4, 4 are connected to each other via a second-layer conductive portion 6. The first-layer conductive portion 5 and the second-layer conductive portion 6 disposed above the first-layer conductive portion 5 are disposed so as to intersect each other. This structure makes it possible to arrange the first electrodes 3 and the second electrodes 4 in such a matrix pattern as to alternate with each other. There are formed insulating portions 7 between the first electrodes 3 and the second electrodes 4. The substrate 2 can be processed in a shape, such as square or rectangular, when planarly viewed, and a material to be used for the substrate 2 may be a transparent material such as glass or an acrylic resin.

A routing wire H1 is connected to each of the first electrode 3 at one end in the X-axis direction, and a routing wire H2 is connected to each of the second electrodes 4 at one end in the Y-axis direction. These routing wires H1, H2 are connected to a drive section not shown in the figure, which is provided in the capacitive touch sensor 1 or in an external apparatus.

Figure 2A:
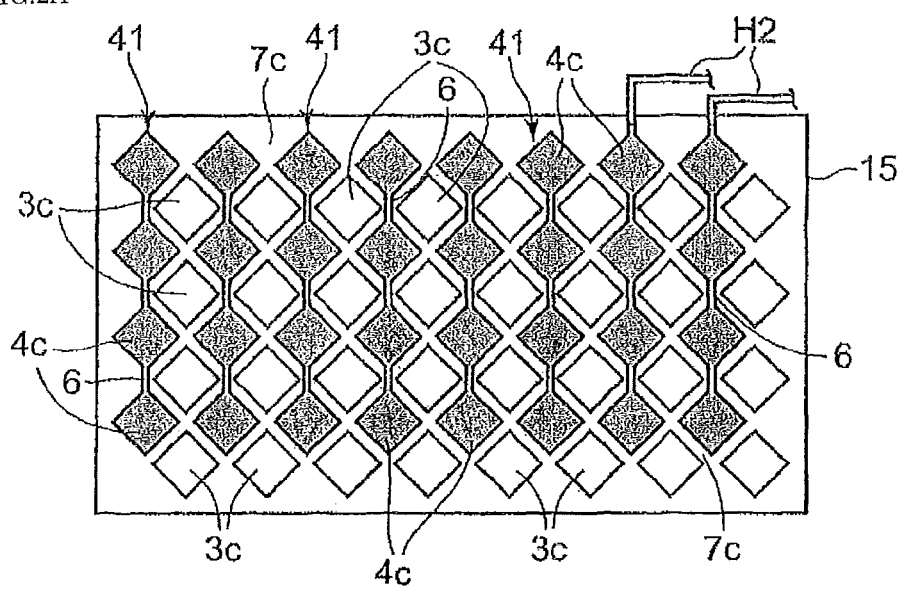
FIG. 2A is a plan view showing the structure of a second layer.
Figure 2B:
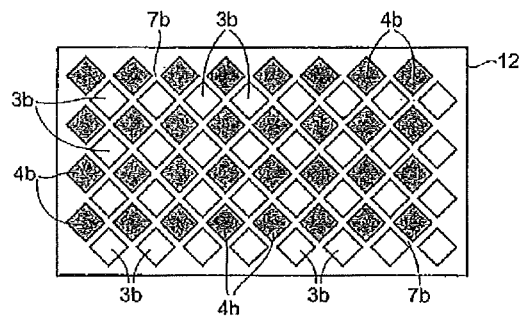
FIG. 2B is a plan view showing the structure of an intermediate layer.
Figure 2C:
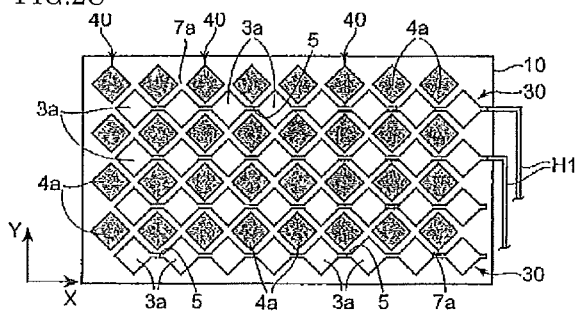
FIG. 2C is a plan view showing the structure of a first layer.

The following will describe in detail the structure of the capacitive touch sensor 1 in the thickness direction. As shown in FIGS. 2A to 2C, the capacitive touch sensor 1 of the present invention has a three-layered structure consisting of a first layer 10 as the lower layer, an intermediate layer 12 formed on the first layer 10, and a second layer 15 as the upper layer formed on the intermediate layer 12, each of which layers is formed of a conductive polymer. For easy understanding, the shapes of the first electrodes 3 and the second electrodes 4 shown in FIGS. 2A to 2C are simplified from those shown in FIG. 1.

The conductive polymer to be used as the material for the first layer 10, the intermediate layer 12, and the second layer 15 may be poly(3,4-ethylenedioxythiophene) (PEDOT) or PEDOT/PSS. PEDOT/PSS is a water-dispersible polythiophene derivative obtained using polystyrene sulfonate (PSS) as a water-soluble polymer and 3,4-ethylenedioxythiophene (EDOT) as a monomer for the conductive polymer.

Many advantages can be found for using PEDOT or PEDOT/PSS, such as favorable conductivity, excellent flatness and transparency, excellent light transmittance, and excellent environmental stability in a conductor state, as well as high bending resistance and stretchability. In particular, PEDOT/PSS contains PSS, which is a water-soluble polymer, as a dopant, and this leads to an improvement in stability under a high-temperature atmosphere. In addition, when PEDOT/PSS is used in the form of a film having a surface resistance value at an antistatic level, the film has a total light transmittance of 98% or higher to hardly affect the appearance.

Besides PEDOT and PEDOT/PSS, any other conductive polymer can also be used, such as polyaniline.

The following will describe in detail the structure of each layer in the capacitive touch sensor 1 of the present invention, and the description will be made in the order of the first layer 10 as the lower layer, the intermediate layer 12, and the second layer 15 as the upper layer (or in the order of FIGS. 2C, 2B, and 2A in the drawings).

In FIG. 2C, the first layer 10 comprises first electrode lines 30, each of which is formed of first first-layer electrodes 3a arranged in the X-axis direction and first-layer conductive portions 5 each connecting the adjacent first first-layer electrodes 3a, 3a in the X-axis direction. In addition, the first layer 10 comprises second electrode lines 40, each of which is formed of second first-layer electrodes 4a arranged in the Y-axis direction. Furthermore, the first layer 10 comprises first-layer insulating portions 7a formed between the first electrode lines 30 and the second first-layer electrodes 4a, between the adjacent first electrode lines 30, 30, and between the adjacent second first-layer electrodes 4a, 4a. That is, the first-layer insulating portions 7a are formed in a region of the first layer 10 excluding the first electrode lines 30 and the second first-layer electrodes 4a (excluding regions where portions of the routing wires H1 are disposed).

In FIG. 2B, the intermediate layer 12 comprises first intermediate-layer electrodes 3b respectively formed on the corresponding first first-layer electrodes 3a; and second intermediate-layer electrodes 4b respectively formed on the corresponding respective second first-layer electrodes 4a. In addition, the intermediate layer 12 comprises intermediate-layer insulating portions 7b formed between the adjacent second intermediate-layer electrodes 4b, 4b, between the adjacent first intermediate-layer electrodes 3b, 3b, and between the first intermediate-layer electrodes 3b and the second intermediate-layer electrodes 4b. That is, the intermediate-layer insulating portions 7b are formed in a region of the intermediate layer 12 excluding the first intermediate-layer electrodes 3b and the second intermediate-layer electrodes 4b. In this regard, the wording "formed on" means that each is formed so as to have whole or partial overlap, and for noise reduction of an electric signal, each may preferably be formed so as to have whole overlap.

In FIG. 2A, the second layer 15 comprises second second-layer electrodes 4c formed on the second intermediate-layer electrodes 4b, respectively; second-layer conductive portions 6 each connecting the second second-layer electrodes 4c, 4c adjacent to each other in the Y axis direction so as to intersect the first-layer conductive portion 5; and first second-layer electrodes 3c formed on the first intermediate-layer electrodes 3b, respectively. In addition, the second layer 15 includes second-layer insulating portions 7c formed between the first second-layer electrodes 3c and third electrode lines 41 each including: a plurality of the second second-layer electrodes 4c; and the second-layer conductive portions 6 each connecting the second second-layer electrodes 4c, 4c adjacent to each other in the Y axis direction, between the adjacent third electrode lines 41, 41, and between the adjacent first second-layer electrodes 3c, 3c. That is, the second-layer insulating portions 7c are formed in a region of the second layer 15 excluding the third electrode lines 41 and the first second-layer electrodes 3c (excluding regions where portions of the routing wires H2 are disposed). The first second-layer electrodes 3c and the second second-layer electrodes 4c are also preferably formed so as to be overlapped with the entireties of the first intermediate-layer electrodes 3b and the second intermediate-layer electrodes 4b, respectively.

The first first-layer electrodes 3a, the first intermediate-layer electrodes 3b, and the first second-layer electrodes 3c form the first electrodes 3 in FIG. 1, and the second first-layer electrodes 4a, the second intermediate-layer electrodes 4b, and the second second-layer electrodes 4c form the second electrodes 4 in FIG. 1. In addition, the first-layer insulating portions 7a, the intermediate-layer insulating portions 7b, and the second-layer insulating portions 7c form the insulating portions 7 in FIG. 1.

The drawings show an example in which the routing wires H1 are connected to the first first-layer electrodes 3a and the routing wires H2 are connected to the second second-layer electrodes 4c. The present invention is, however, not limited to this example, but routing wires H1 may be connected to any of the first first-layer electrodes 3a, the first intermediate-layer electrodes 3b, and the first second-layer electrodes 3c, and routing wires H2 may be connected any of the second first-layer electrodes 4a, the second intermediate-layer electrodes 4b, and the second second-layer electrodes 4c. In FIGS. 2A and 2C, the routing wires H1 and H2 are partly shown.

Figure 3A:
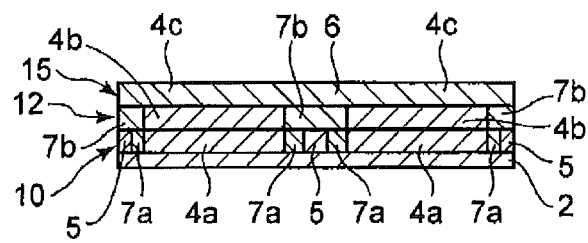
FIG. 3A is a cross-sectional view taken along line A-A' of FIG. 1.

The following will describe a cross-sectional structure of the capacitive touch sensor 1. FIG. 3A is a cross-sectional view taken along line A-A' of FIG. 1, FIG. 3B is a cross-sectional view taken along line B-B' of FIG. 1, and FIG. 3C is a cross-sectional view taken along line C-C' of FIG. 1.

As shown in FIG. 3A, in the cross section taken along A-A' line of FIG. 1, i.e., in the cross section, which is perpendicular to the substrate 2 and passing through the adjacent two second electrodes 4, 4 across the first-layer conductive portion 5, the first layer 10 is formed of the adjacent two second first-layer electrodes 4a, 4a; the first-layer conductive portion 5 formed between the two second first-layer electrodes 4a, 4a; the first-layer insulating portion 7a formed between the first-layer conductive portion 5 and one of the adjacent second first-layer electrodes 4a; and the first-layer insulating portion 7a formed between the first-layer conductive portion 5 and the other of the adjacent second first-layer electrodes 4a. In addition, the intermediate layer 12 is formed of one of the second intermediate-layer electrodes 4b formed on one of the second first-layer electrodes 4a; the intermediate-layer insulating portion 7b formed on the first-layer insulating portions 7a, 7a and the first-layer conductive portion 5; and the other of the second intermediate-layer electrodes 4b formed on the other of the second first-layer electrodes 4a. Furthermore, the second layer 15 is formed of the second second-layer electrodes 4c, 4c formed on the second intermediate-layer electrodes 4b, 4b, and the second-layer conductive portion 6 connecting the second second-layer electrodes 4c, 4c.

Figure 3B:
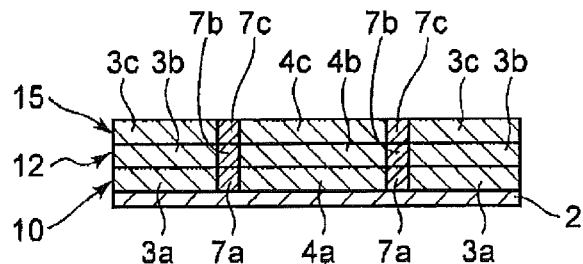
FIG. 3B is a cross-sectional view taken along line B-B' of FIG. 1.

The structure of the cross section taken along line B-B' of FIG. 1 is formed, as shown in FIG. 3B, of layered structures each consisting of the first first-layer electrode 3a, the first intermediate-layer electrode 3b, and the first second-layer electrode 3c; and a layered structure consisting of the second first-layer electrode 4a, the second intermediate-layer electrode 4b, and the second second-layer electrode 4c, via layered structures each consisting of the first-layer insulating portion 7a, the intermediate-layer insulating portion 7b, and the second-layer insulating portion 7c.

Figure 3C:
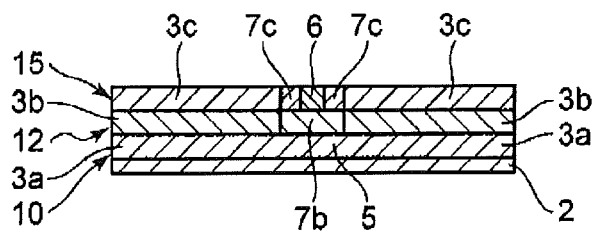
FIG. 3C is a cross-sectional view taken along line C-C' of FIG. 1.

In the cross section taken along line C-C' of FIG. 1, the first layer 10 is formed of the first first-layer electrodes 3a, 3a; and the first-layer conductive portion 5 connecting these electrodes, as shown in FIG. 3C. In addition, the intermediate layer 12 is formed of the first intermediate-layer electrodes 3b, 3b respectively formed on the corresponding first first-layer electrodes 3a, 3a; and the intermediate-layer insulating portion 7b formed on the first-layer conductive portion 5. Furthermore, the second layer 15 is formed of the first second-layer electrodes 3c, 3c respectively formed on the corresponding first intermediate-layer electrodes 3b, 3b; and the second-layer conductive portions 6 and the second-layer insulating portions 7c, 7c, both of which are formed on the intermediate-layer insulating portion 7b.

As described above, according to the present invention, in the structure that the first-layer conductive portions 5 and the second-layer conductive portions 6 intersect with each other, the first-layer conductive portions 5 and the second-layer conductive portions 6 can be insulated from each other by the intermediate-layer insulating portions 7b of the intermediate layer 12. In addition, connection between the adjacent second first-layer electrodes 4a, 4a in the first layer 10 can be achieved by forming the second intermediate-layer electrodes 4b on the second first-layer electrodes 4a in the intermediate layer 12, forming the second second-layer electrodes 4c on the second intermediate-layer electrodes 4b, and forming the second-layer conductive portion 6 connecting the adjacent second second-layer electrodes 4c, 4c.

As described above, in the structure that the first-layer conductive portions 5 and the second-layer conductive portions 6 are insulated from each other by the intermediate-layer insulating portions 7b, the first electrodes 3 (i.e., the first first-layer electrodes 3a, the first intermediate-layer electrodes 3b, and the first second-layer electrodes 3c) and the second electrodes 4 (i.e., the second first-layer electrodes 4a, the second intermediate-layer electrodes 4b, and the second second-layer electrodes 4c) are provided in each of the first layer 10, the intermediate layer 12, and the second layer 15, thereby causing no step formation between the intersection portions and the electrode portions. Therefore, pattern visibility caused by step formation can be suppressed. In addition, in each of the first layer 10, the intermediate layer 12, and the second layer 15, part of the same film is made to have decreased conductivity, while maintaining optical properties, by inactivation. Thus, the optical properties (e.g., refractive index, transmittance, hue) can be made uniform between the intersection portions and the electrode portion. Accordingly, pattern visibility can be further suppressed or prevented.

In the foregoing description, PEDOT or PEDOT/PSS is used as the material of the first layer 10, the intermediate layer 12, and the second layer 15, which is, however, not restrictive, and alternatively, PEDOT or PEDOT/PSS may be used as the material of the first layer 10 and the intermediate layer 12, while another conductive polymer can be used as the material of the second layer 15.

2. Manufacturing Method of Capacitive Touch Sensor

The following will describe an example of the manufacturing method of the capacitive touch sensor 1 with the cross-sectional structure of the capacitive touch sensor 1 as shown above in FIG. 3A. FIG. 4 is an explanatory view showing the manufacturing steps for the capacitive touch sensor 1 shown in FIG. 3A.

Figure 4A:
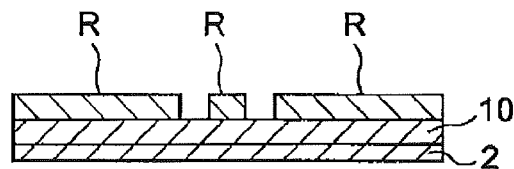
FIG. 4A is an explanatory view showing a manufacturing step for the capacitive touch sensor of FIG. 3A.

In FIG. 4A, the first layer 10 is first formed on the substrate 2 by, for example, a gravure printing method. The printing temperature can be set at 100° C., and the printing time can be set at 10 minutes.

In FIG. 4A, a resist R is then formed by, for example, a screen printing method on the first layer 10 and in regions where the second first-layer electrodes 4a are to be formed. That is, the regions on the first layer 10 where the resist R was not formed are inactivated in a later step. As the material of the resist R, Clevios (registered trademark) SET can be used. In the screen printing method, the printing temperature can be set at 80° C., and the printing time can be set at 5 minutes.

Subsequently, the product in the state of FIG. 4A is immersed into an inactivator. This makes the main chain of a conductive polymer cut in the portions of the first layer 10 not coated with the resist R, by an oxidation mechanism of the inactivator, so that the conductive polymer has conductivity reduced or lost. In other words, the inactivation can make only the conductivity, while maintaining the polymer film, of the conductive polymer reduced or lost. Examples of the inactivator that can be used may include aqueous solutions such as of sodium hypochlorite or sodium perchlorate.

Other examples of the inactivating means for the first layer 10 may include a treatment for cutting off the relation of a conductive polymer to a dopant as an additive for making the conductive polymer exhibit conductivity by extracting electrons from the conductive polymer. More specifically, when PEDOT/PSS is used as the conductive polymer, the PSS as a dopant is introduced to the doping site of the PEDOT in the process of forming a film of the PEDOT/PSS. The injection of positive charges into (or extraction of electrons from) the PEDOT by the PSS leads to the exhibition of conductivity. The inactivation is achieved by, for example, polymer degradation to make the PSS lose the function as a dopant.

Figure 4B:
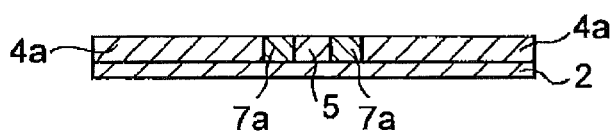
FIG. 4B is an explanatory view showing a manufacturing step for the capacitive touch sensor of FIG. 3A.

The inactivation results in, as shown in FIG. 4B, that the portions coated with the resist R become the first-layer conductive portion 5 and the second first-layer electrodes 4a, 4a, whereas the first-layer insulating portions 7a, 7a can be formed on the portions not coated with the resist R. After the inactivation, the resist R is removed. In this removal, for example, ammonia water having a temperature of 40° C. can be used, and the treatment time can be set at 30 seconds.

Figure 4C:
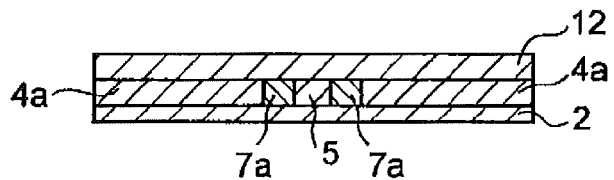
FIG. 4C is an explanatory view showing a manufacturing step for the capacitive touch sensor of FIG. 3A.

Subsequently, in FIG. 4C, the intermediate layer 12 is formed on the first layer 10. Then, in FIG. 4D, a resist R is formed on the intermediate layer 12 and in the regions where the second intermediate-layer electrodes 4b are to be formed, by the same method as described above. That is, the regions on the intermediate layer 12 where the resist R was not formed are inactivated in a later step.

Figure 4D:
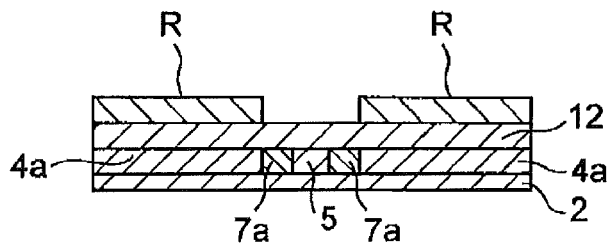
FIG. 4D is an explanatory view showing a manufacturing step for the capacitive touch sensor of FIG. 3A.

In the state of FIG. 4D, the intermediate layer 12 is subjected to the same inactivation as described above. After the inactivation, the resist R is removed.

Figure 4E:
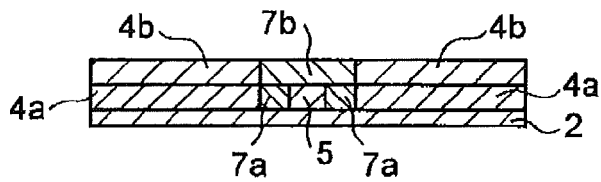
FIG. 4E is an explanatory view showing a manufacturing step for the capacitive touch sensor of FIG. 3A.
Figure 4F:
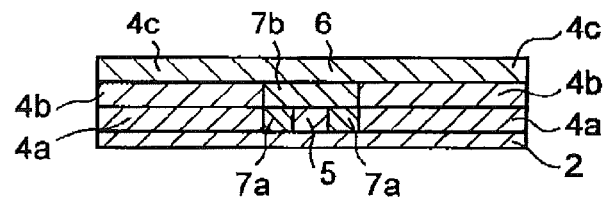
FIG. 4F is an explanatory view showing a manufacturing step for the capacitive touch sensor of FIG. 3A.

The inactivation results in, as shown in FIG. 4E, that the portions coated with the resist R become the second intermediate-layer electrodes 4b, 4b, whereas the intermediate-layer insulating portion 7b can be formed on the portions not coated with the resist R. Then, in FIG. 4F, the second second-layer electrodes 4c, 4c and the second-layer conductive portion 6 connecting the second second-layer electrodes 4c, 4c are formed on the intermediate layer 12.

Figure 5:
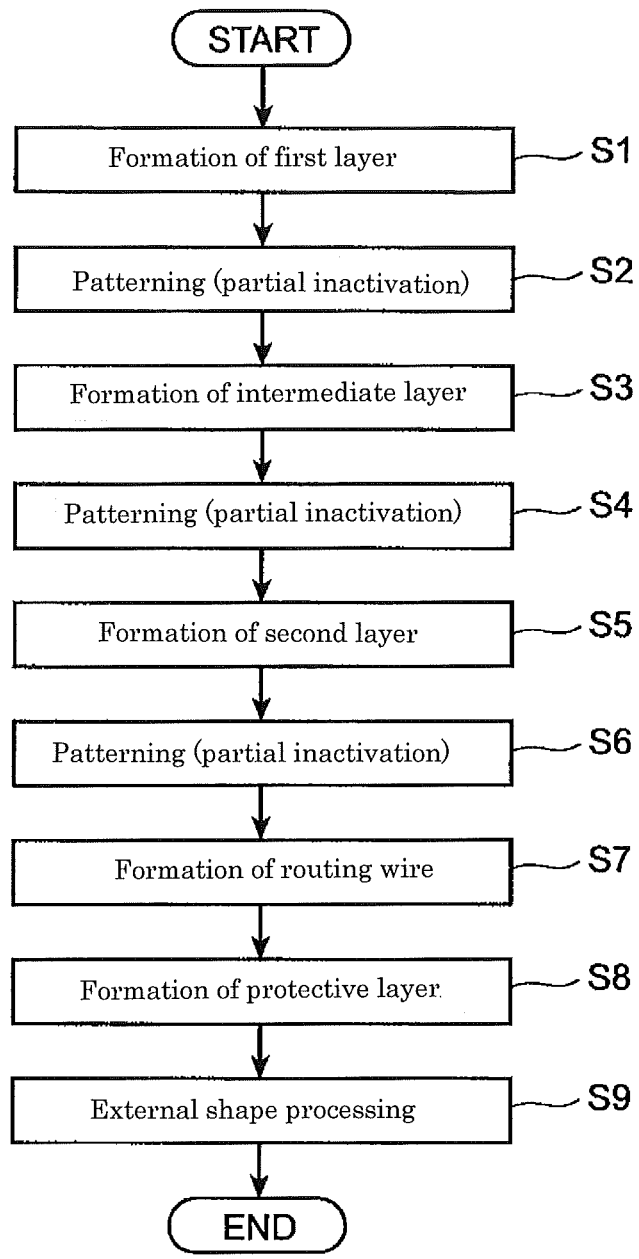
FIG. 5 is a flowchart showing a manufacturing order for a capacitive touch sensor.

FIG. 5 is a flowchart showing the manufacturing order of the capacitive touch sensor 1. Some of the contents overlap with the above, and therefore, a simple description will be given below.

First, in FIG. 5, the first layer 10 is formed on the substrate 2 (step S1). Then, the first layer thus formed 10 is patterned (step S2).

Then, the intermediate layer 12 is formed on the first layer 10 (step S3). Subsequently, the intermediate layer 12 thus formed is patterned (step S4).

Then, the second layer 15 is formed on the intermediate layer 12 (step S5). Subsequently, the second layer 15 thus formed is patterned (step S6).

Subsequently, a routing circuit including the routing wires H1 and H2 above is formed as described above (step S7), and a protective layer is formed (step S8), followed by external shape processing (step S9), thereby completing the capacitive touch sensor 1.

3. Structure of Display Device Including Capacitive Touch Sensor

Figure 6:
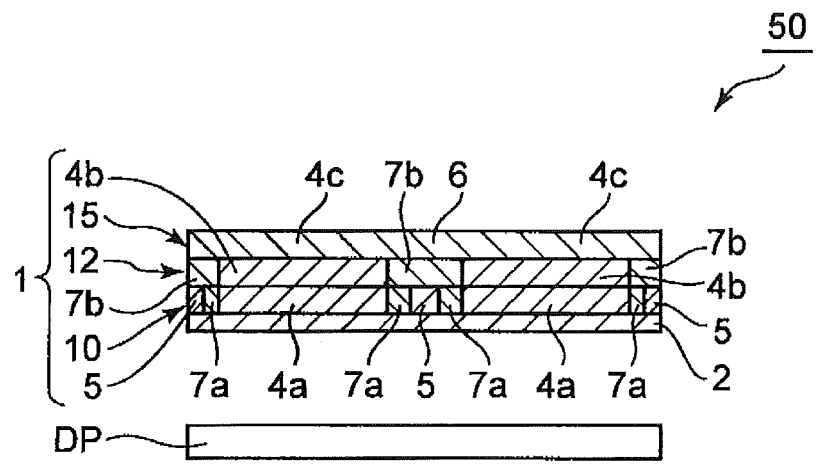
FIG. 6 is a cross-sectional view showing the structure of a display device equipped with a capacitive touch sensor according to the present invention.

FIG. 6 is a cross-sectional view showing the structure of a display device 50 with the capacitive touch sensor 1 according to the present invention.

As shown in FIG. 6, the display device 50 comprises the capacitive touch sensor 1 and a display DP as a display panel, which is provided below the capacitive touch sensor 1 so as to be spaced apart therefrom. The display DP can be formed of a display element such as a liquid crystal display (LCD) or an organic EL display (OLED).

The present invention is not restricted by the foregoing embodiments. The present invention can be put into practice after appropriate modifications or variations within a range meeting the gist of the present invention, all of which are included in the technical scope of the present invention.

EXAMPLES

The present invention will hereinafter be described more specifically by way of Examples, but the present invention is not limited to the following Examples. The present invention can be put into practice after appropriate modifications or variations within a range meeting the gist described above and below, all of which are included in the technical scope of the present invention.

1. Evaluation of Pattern Visibility

The capacitive touch sensor 1 using PEDOT/PSS as the material of each of the first layer 10, the intermediate layer 12, and the second layer 15 was measured for haze and transmittance in Example 1. The term "haze" means a degree of cloudiness, and its lower values indicate higher brightness upon projecting. A conventional capacitive touch sensor as described below was used in Comparative Example 1.

Figure 7A:
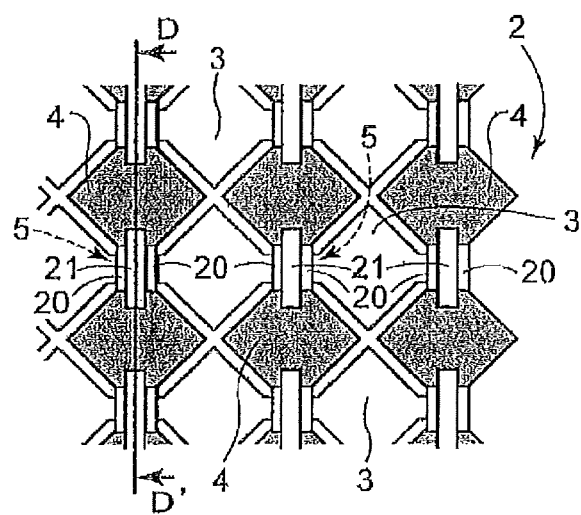
FIG. 7A is a plan view showing the structure of a capacitive touch sensor according to Comparative Example 1.
Figure 7B:
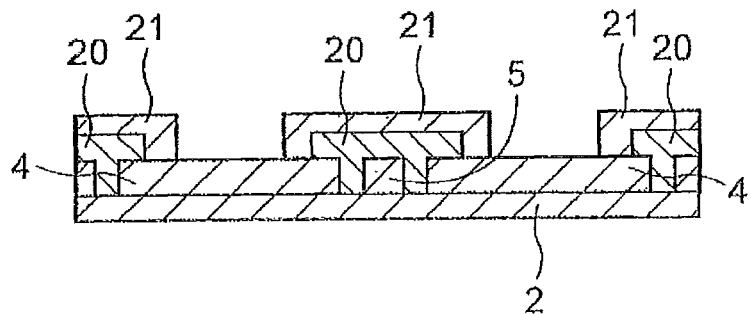
FIG. 7B is a cross-sectional view taken along line D-D' of FIG. 7A.

FIG. 7A is a plan view showing the structure of the capacitive touch sensor according to Comparative Example 1. FIG. 7B is a cross-sectional view taken along line D-D' of FIG. 7A.

In the capacitive touch sensor of Comparative Example 1 shown in FIGS. 7A and 7B, first-layer conductive portions 5 each connecting adjacent first electrodes 3, 3 are formed on a base material 2, and second electrodes 4, 4 are formed on the base material 2 at both sides of each first-layer conductive portion 5 so as to be spaced apart therefrom. The first-layer conductive portion 5 and the second electrodes 4, 4 are insulated from each other by an insulating layer 20. In addition, the adjacent second electrodes 4, 4 are connected to each other via a connection layer 21 formed so as to cover the insulating layer 20.

The capacitive touch sensor of Comparative Example 1 has steps between electrode portions (i.e., regions of the second electrodes 4) and intersection portions (i.e., intersection regions of the first-layer conductive portions 5 and the connection layers 21). The steps each have a height (i.e., distance from the upper surface of the second electrode 4 to the upper surface of the connection layer 21) of 5 μm.

The results of transmittance and haze measurement are shown in Table 1.

TABLE 1

| | Electrode portions | | Intersection portions | | |
|---|---|---|---|---|---|
| | Haze (%) | Transmittance (%) | Haze (%) | Transmittance (%) | Less pattern visibility |
| Example 1 | 0.7 | 89 | 0.75 | 88 | acceptable |
| Comparative Example 1 | 1.3 | 90 | 1.5 | 89 | unacceptable |

As shown in Table 1, almost no difference of transmittance in the electrode portions and in the intersection portions can be found between Example 1 and Comparative Example 1.

However, a great difference of haze in the electrode portions and in the intersection portions can be found between Example 1 and Comparative Example 1, and particularly in the intersection portions, the haze of Comparative Example 1 was two times greater than the haze of Example 1.

For evaluation of less pattern visibility, the capacitive touch sensors of Example 1 and Comparative Example 1 were visually observed. Almost no pattern visibility was caused in the capacitive touch sensor of Example 1, whereas pattern visibility was caused in the capacitive touch sensor of Comparative Example 1.

From these results, the capacitive touch sensor of Comparative Example 1 having steps was confirmed to have increased haze and unacceptable pattern visibility. On the other hand, the capacitive touch sensor 1 of the present invention having no steps and using PEDOT/PSS as the material of each of the first layer 10, the intermediate layer 12, and the second layer 15, was confirmed to have decreased haze and reduced pattern visibility.

2. Method of Distinguishing Between Active Portion (Conductive Portion) and Inactive Portion (Insulating Portion).

Figure 8A:
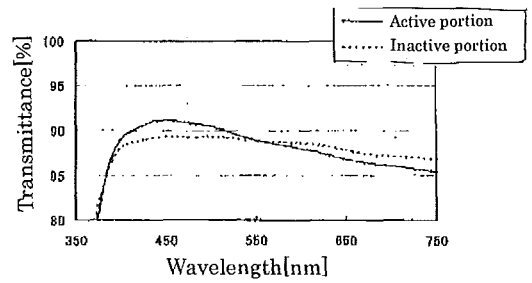
FIG. 8A is a graph showing a relationship of transmittance to light wavelength for each of an active portion and an inactive portion.
Figure 8B:
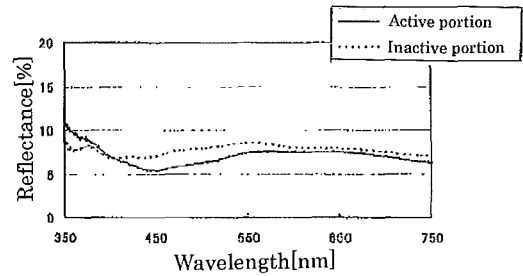
FIG. 8B is a graph showing a relationship of reflectance to light wavelength for each of the active portion and the inactive portion.
Figure 8C:
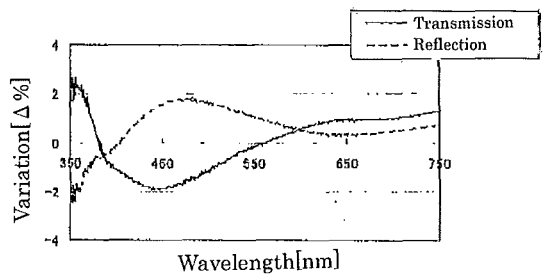
FIG. 8C is a graph showing a relationship of a difference between the transmittance of the inactive portion and the transmittance of the active portion to light wavelength and a relationship of a difference between the reflectance of the inactive portion and the reflectance of the active portion to light wavelength.

FIG. 8A is a graph showing a relationship of transmittance to light wavelength for an active portion and an inactive portion, and FIG. 8B is a graph showing a relationship of reflectance to light wavelength for the active portion and the inactive portion. In addition, FIG. 8C is a graph showing a relationship of a difference between the transmittance of the inactive portion and the transmittance of the active portion to light wavelength, and a relationship of a difference between the reflectance of the inactive portion and the reflectance of the active portion to light wavelength. The graph of FIG. 8C was prepared on the basis of measurement data of FIGS. 8A and 8B.

In FIG. 8C, when the wavelength of light is about 350 nm or in the range of 450 nm to 500 nm, the greatest differences between the inactive portion and the active portion can be found both in transmittance and in reflectance. Therefore, the use of light in the above range of wavelength provides an expectation that inactive portions are easily determined from differences both in transmittance and in reflectance.

Figure 9:
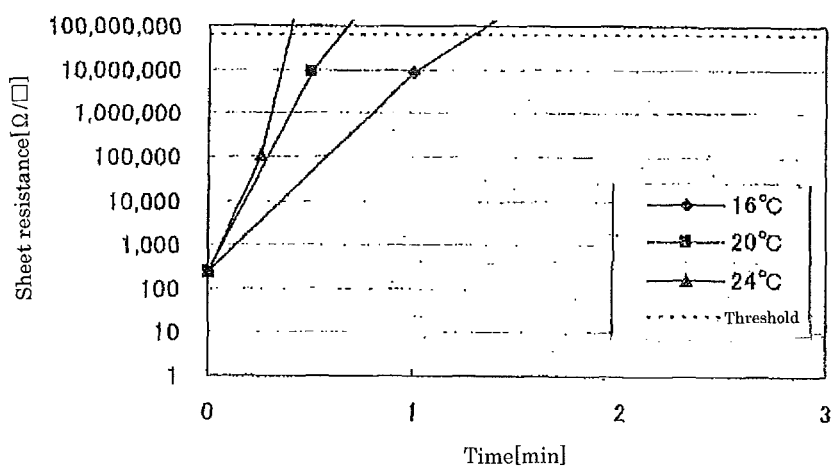
FIG. 9 is a graph showing a relationship of sheet resistance to treatment time.

For evaluation of a decrease in conductivity caused by inactivation, the conductive polymer layer was immersed in an aqueous sodium hypochlorite solution as an inactivation liquid for a prescribed time, followed by measurement of sheet resistance. FIG. 9 is a graph showing a relationship of sheet resistance to treatment time.

In FIG. 9, the inactivation liquid was set to have a liquid temperature of 16° C., 20° C., or 24° C. It was confirmed that the sheet resistance value can be increased (i.e., the layer can be shifted from conductive state to insulation state) in a shorter immersion time as the liquid temperature becomes higher. As shown in Table 8 below, the conductive polymer layer reached insulation state in 2 minutes when the liquid temperature was 16° C., in 1 minute when the liquid temperature was 20° C., and in 0.5 minutes when the liquid temperature was 24° C. The conductive polymer layer was regarded as being in insulation state when the sheet resistance became $10^7 \Omega/\square$ or higher.

TABLE 2

| | | Inactivation liquid temperature | | |
|---|---|---|---|---|
| | | 16° C. | 20° C. | 24° C. |
| Immersion time (min) | 0 | 240 | 240 | 240 |
| | 0.25 | — | — | 110,000 |
| | 0.5 | — | 8,700,00 | insulating |
| | 1 | 9,000,000 | Insulating | — |
| | 1.5 | — | — | — |
| | 2 | insulating | — | — |

(Unit: $\Omega/\square$)

EXPLANATIONS OF SYMBOLS OR NUMERALS

1 Capacitive touch sensor
2 Substrate
3 First electrode
3a First first-layer electrode
3b First intermediate-layer electrode
3c First second-layer electrode
4 Second electrode
4a Second first-layer electrode
4b Second intermediate-layer electrode
4c Second second-layer electrode
5 First-layer conductive portion
6 Second-layer conductive portion
7 Insulating portion
7a First-layer insulating portion
7b Intermediate-layer insulating portion
7c Second-layer insulating portion
10 First-layer
12 Intermediate-layer
15 Second-layer
30 First-electrode line
40 Second-electrode line
41 Third-electrode line
50 Display device

The invention claimed is:

1. A capacitive touch sensor comprising a layered structure of a first layer, an intermediate layer, and a second layer, each of which is formed on one main surface of a substrate and is made of a conductive polymer, wherein
   the first layer has first-electrode lines, each of which is formed of first first-layer electrodes arranged in a first direction and first-layer conductive portions each connecting the adjacent first first-layer electrodes; and second-electrode lines, each of which is formed of second first-layer electrodes arranged in a second direction different from the first direction;
   the intermediate layer has first intermediate-layer electrodes respectively formed on the corresponding first first-layer electrodes; and second intermediate-layer electrodes respectively formed on the corresponding second first-layer electrodes;
   the second layer has second second-layer electrodes respectively formed on the corresponding second intermediate-layer electrodes; second-layer conductive portions each connecting the adjacent second second-layer electrodes in the second direction so as to intersect with the first-layer conductive portions; and first second-layer electrodes respectively formed on the corresponding first intermediate-layer electrodes;
   the first layer further has first-layer insulating portions formed between the first-electrode lines and the second first-layer electrodes;
   the intermediate layer further has intermediate-layer insulating portions formed between the adjacent second intermediate-layer electrodes; and
   the second layer further has second-layer insulating portions formed between third-electrode lines and the first second-layer electrodes, the third-electrode lines being formed of the second second-layer electrodes and the second-layer conductive portions.

2. The capacitive touch sensor according to claim 1, wherein
   the first-layer insulating portions are formed between the adjacent first-electrode lines and between the adjacent second first-layer electrodes;
   the intermediate-layer insulating portions are formed between the adjacent first intermediate-layer electrodes and between the first intermediate-layer electrodes and the second intermediate-layer electrodes; and
   the second-layer insulating portions are formed between the adjacent third-electrode lines and between the adjacent first second-layer electrodes.

3. The capacitive touch sensor according to claim 1, wherein the first-layer insulating portions, the second-layer insulating portions, and the intermediate-layer insulating portions are formed by inactivation of a conductive polymer.

4. The capacitive touch sensor according to claim 1, wherein the first layer and the intermediate layer are formed of a conductive polymer of the same type.

5. The capacitive touch sensor according to claim 1, wherein the intermediate layer and the second layer are formed of a conductive polymer of the same type.

6. The capacitive touch sensor according to claim 1, wherein the conductive polymer is poly(3,4-ethylenedioxythiophene) (PEDOT) or PEDOT/PSS.

7. The capacitive touch sensor according to claim 1, wherein the first layer has a thickness of 0.01 to 5.0 μm.

8. The capacitive touch sensor according to claim 1, wherein the intermediate layer has a thickness of 0.01 to 5.0 μm.

9. A display device comprising a display panel and a touch sensor attached thereto, which touch sensor is a capacitive touch sensor as set forth in claim 1.

10. A method for manufacturing a capacitive touch sensor, comprising the steps of:
    forming a first layer made of a conductive polymer on one main surface of a substrate;
    patterning the first layer to form multiple first-electrode lines, each of which is formed of first first-layer electrodes arranged in a first direction and first-layer conductive portions each connecting the adjacent first first-layer electrodes; second-electrode lines, each of which is formed of second first-layer electrodes arranged in a second direction different from the first direction; and first-layer insulating portions formed between the first-electrode lines and the second first-layer electrodes;
    forming an intermediate layer made of a conductive polymer on the first layer;
    patterning the intermediate layer to form first intermediate-layer electrodes respectively formed on the corresponding first first-layer electrodes; second intermediate-layer electrodes respectively formed on the corresponding second first-layer electrodes; and intermediate-layer insulating portions formed between the adjacent second intermediate-layer electrodes;
    forming a second layer made of a conductive polymer on the intermediate layer; and
    patterning the second layer to form second second-layer electrodes respectively formed on the corresponding second intermediate-layer electrodes; second-layer conductive portions each connecting the adjacent second second-layer electrodes in the second direction so as to intersect with the first-layer conductive portions; first second-layer electrodes respectively formed on the corresponding first intermediate-layer electrodes; second-layer insulating portions formed between third-electrode lines and the first second-layer electrodes, the third-electrode lines being formed of the second second-layer electrodes and the second-layer conductive portions.

* * * * *